United States Patent
Fischer

(10) Patent No.: US 8,203,227 B2
(45) Date of Patent: Jun. 19, 2012

(54) RETRO-FITTING A WIND ENERGY CONVERTER

(75) Inventor: Martin Fischer, Klagenfurt (AT)

(73) Assignee: AMSC Austria GmbH, Klagenfurt am Wörthersee (AT)

( * ) Notice: Subject to any disclaimer, the term of this patent is extended or adjusted under 35 U.S.C. 154(b) by 0 days.

(21) Appl. No.: 12/751,448

(22) Filed: Mar. 31, 2010

(65) Prior Publication Data

US 2011/0133459 A1 Jun. 9, 2011

(51) Int. Cl.
*F03D 9/00* (2006.01)
*H02P 9/00* (2006.01)

(52) U.S. Cl. .......................... 290/44; 322/44

(58) Field of Classification Search .................. 290/44, 290/55; 310/68 R; 322/44, 17, 59
See application file for complete search history.

(56) References Cited

U.S. PATENT DOCUMENTS

| | | | | |
|---|---|---|---|---|
| 3,546,550 A | * | 12/1970 | Jiri et al. ................. | 318/761 |
| 7,786,608 B2 | * | 8/2010 | Menke ..................... | 290/44 |
| 2002/0153859 A1 | | 10/2002 | Dymond et al. | |
| 2004/0164701 A1 | * | 8/2004 | Hallidy ..................... | 318/767 |
| 2005/0012339 A1 | | 1/2005 | Mikhail et al. | |
| 2007/0273155 A1 | * | 11/2007 | Barton et al. ............. | 290/44 |
| 2009/0167095 A1 | | 7/2009 | Rivas et al. | |
| 2010/0117605 A1 | * | 5/2010 | Kretschmann ........... | 322/28 |

FOREIGN PATENT DOCUMENTS

| EP | 1513251 | 3/2005 |
|---|---|---|
| JP | 61018336 | 1/1986 |

OTHER PUBLICATIONS

Wegener, et al, "Operation of Double Fed Induction Generators with Unmodified Low Cost Standard Converters" *Institute of Electrical Drives and Mechatronics*, Univeristy of Dortmund, Germany (2006) 5 pages.
Babu et al, "Wind Turbine Driven Doubly-Fed Induction Generator with Grid Disconnection" *Department of Electrical Engineering*, National Institute of Technology Rourkela Rourkela—769008, India, 3 pages.
Melicio, et al, "Doubly Fed Induction Generator Systems for Variable Speed Wind Turbine" *ISEL, DEEA, Seccão de Economia e Gestão Rua Conselheiro Emidio Navarro*, 1 1950-062 Lisboi (Portugal). (2004) 4 pages.
Røstøen, et al, "Doubly Fed Induction Generator in a Wind Turbine" *Norwegian University of Science and Technology (NTNU)* (2002) 7 pages.

* cited by examiner

*Primary Examiner* — Julio Cesar Gonzalez
(74) *Attorney, Agent, or Firm* — Occhiuti Rohlicek & Tsao LLP

(57) ABSTRACT

A method for retro-fitting wind-energy conversion system includes disconnecting a first set of multiple windings from active circuitry; shorting together the first set of multiple windings; and connecting a second set of multiple windings to the active circuitry.

24 Claims, 2 Drawing Sheets

RETRO-FITTING A WIND ENERGY CONVERTER

FIELD OF DISCLOSURE

This disclosure relates to energy conversion systems, and in particular, to conversion of wind energy into electrical energy.

BACKGROUND

Induction generators are commonly used to generate electricity from wind. An induction generator includes a rotor, which provides a spatially varying magnetic field, and a stator, which has stator windings. As the wind turns the rotor, the magnetic field at the stator windings changes as a function of time. Since a time-varying magnetic field induces a time-varying voltage, this generates a time-varying stator voltage across the terminals of the stator windings.

A voltage waveform provided to a power grid must meet certain requirements. For example, the voltage waveform should have a frequency that strays by only a limited amount from a target line-frequency. In addition, the harmonic content of the voltage waveform should remain below a specified upper limit. Because wind speed varies considerably, the rotor will not necessarily rotate at a constant angular velocity. Thus, without some sort of correction, the voltage waveform provided by a wind-powered induction generator may vary considerably with wind speed.

To provide greater control of the waveform despite the varying winds, one can use active circuitry to control the waveform provided to the power grid. The active circuitry includes an AC/DC converter that converts the varying output of the stator into DC, and a DC to AC converter to take that DC waveform and convert it into the desired waveform.

One way to connect an induction generator to a power grid is to connect the stator directly to the power grid, and to connect the rotor to the power grid through active circuitry. A controller for controlling the active circuitry receives input indicative of both the angular frequency of the rotor and the waveform provided to the power grid. This enables the controller to provide feedback control over the current on the rotor. Based in part on these inputs, the controller adjusts the slip angle between the stator and the rotor. Since the stator windings respond to the rate of change in the magnetic field, and since the magnetic field is generated by current on the rotor, one can, by properly controlling that current, cause the stator windings to respond as if the rotor were turning at a constant angular velocity. An induction generator connected to the grid as described above is often referred to as a "doubly-fed induction generator."

An advantage of the doubly-fed induction generator is that the bulk of the power provided by the generator bypasses the active circuitry. This both avoids incurring losses in the active circuitry for the bulk of the power, and avoids having to provide active circuitry that is rated to handle the entire output of the generator. In a typical installation, the active circuitry handles about 20% of the total output of the generator. The remaining 80% bypasses the active circuitry altogether.

Another method for connecting an induction generator to a power grid passes the stator voltage through active circuitry. An induction generator connected to the grid as described above is often referred to as a "full-converter induction generator."

In a full-converter induction generator, the active circuitry is rated to handle the generator's entire power output. One disadvantage of the full-converter induction generator arises from the considerable losses sustained as a result of the conversions from AC to DC and back again. On the other hand, a full-converter induction generator generally provides better control over the characteristics of the stator voltage.

In the past, when wind turbines were not so common, the greater variations in the stator voltage associated with the double-fed induction generators would have an insignificant effect on the power grid. As wind turbines have become more popular, this is no longer so. As a result, many utilities have begun to require higher quality power output from wind turbines. This has made it necessary to replace double-fed induction generators with full-converter induction generators. The process of replacing double-fed induction generators with full-converter induction generators is time-consuming and expensive.

SUMMARY

The invention is based on the recognition of a way to retrofit existing double-fed induction generators so that they function as if they were full-converter induction generators.

In one aspect, the invention features a method for retro-fitting wind-energy conversion system. Such a method includes disconnecting a first set of multiple windings from active circuitry; shorting together the first set of multiple windings; and connecting a second set of multiple windings to the active circuitry.

Practices of the invention include those in which shorting together the first set of multiple windings includes shorting a slip ring assembly, and those in which shorting together the first set of multiple windings includes causing a short circuit on a non-rotating side of a brush assembly that couples to the windings.

Additional practices include those in which the first set of windings are rotor windings, as well as those in which the second set of windings includes stator windings.

An additional practice of the invention includes, prior to disconnecting the first set of multiple windings, using the wind-energy conversion system to convert wind energy into a first amount of electrical power; and following the connection of the second set, using the wind-energy system to convert wind energy into a second amount of electrical power, the second amount being equal to the first amount.

Another practice of the invention includes, prior to the disconnecting the first set of multiple windings, using the wind-energy conversion system to convert wind energy into a first amount of electrical power; and following the connection of the second set of multiple windings, using the wind-energy system to convert wind energy into a second amount of electrical power, the second amount being made equal to the first amount by causing carried by the second set of multiple windings to compensate for loss of power carried the first set of windings.

In another aspect, the invention features an apparatus for conversion of wind energy. Such an apparatus includes a rotor having multiple rotor windings; a short circuit electrically connecting the multiple rotor windings to each other; a wind-energy collector coupled to the rotor for causing the rotor to rotate; active circuitry having inputs for receiving multiple input waveforms and converting the input waveforms from first frequencies to second frequencies; a controller for controlling the active circuitry at least in part on the basis of rotation of the wind-energy collector; and a stator having multiple stator windings, the multiple stator windings being connected to the multiple inputs of the active circuitry.

In some embodiments, the short circuit includes a connection between slip rings in a slip ring assembly.

In other embodiments, the short circuit is disposed on a non-rotating side of a brush coupling the rotor windings.

These and other features of the invention will be apparent from the detailed description and the accompanying figures, in which:

DETAILED DESCRIPTION

Figure 1:
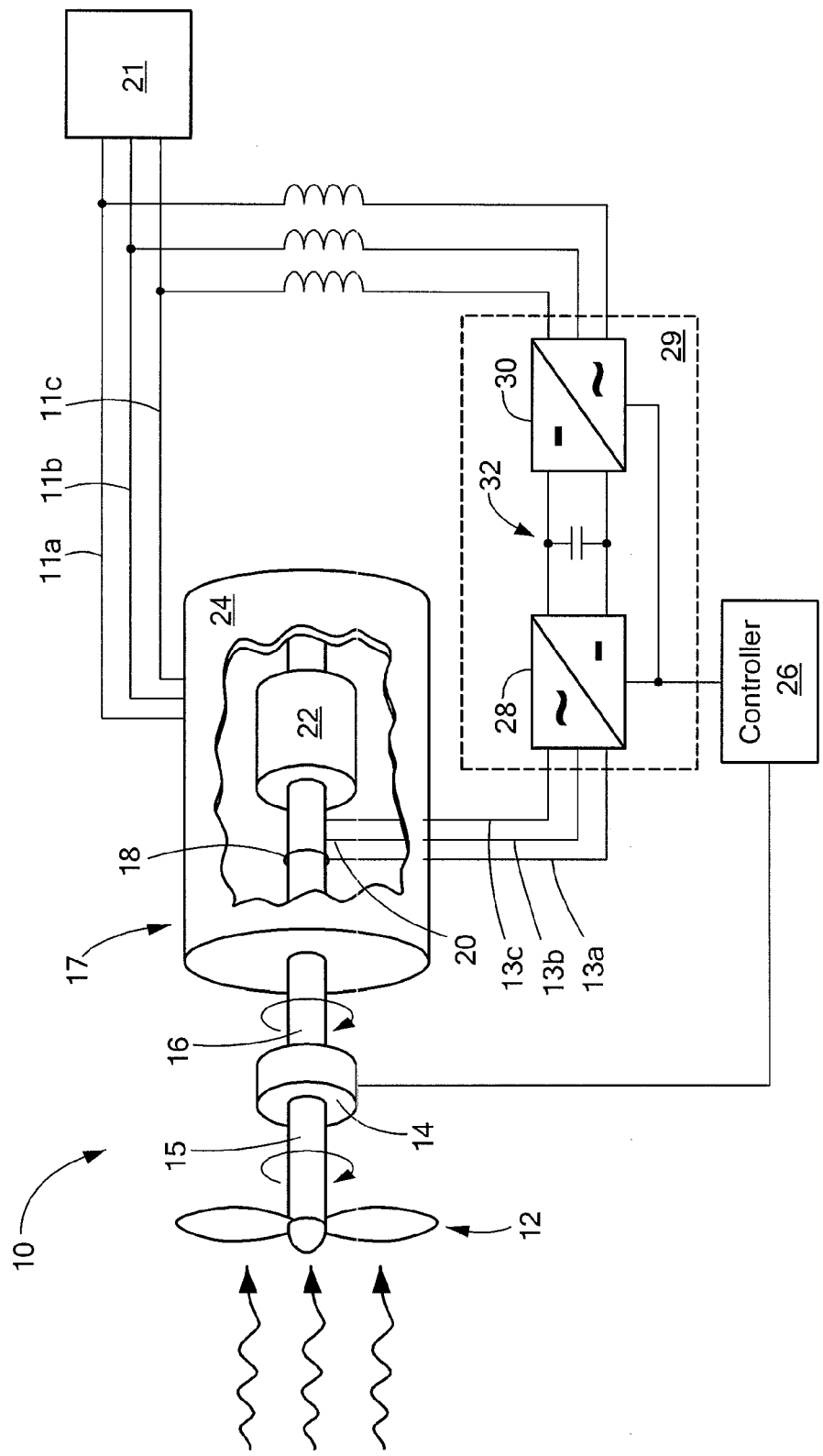
FIG. 1 shows a wind-energy converter.

FIG. 1 shows a wind energy conversion system 10 having a wind-energy collector 12 connected to a gear box 14 by a first drive-shaft 15. A second drive shaft 16 connects the gear box 12 to a rotor 22 of an induction generator 17, shown in more detail in FIG. 2. As the second shaft 16 rotates, a voltage induced in three sets of stator windings 11a-c of a stator 24 provides three-phase power to a power grid 21.

In a typical double-fed induction generator, three sets of rotor windings 13a-13c carry three different phases of current, each of which is separated from the others by 120 degrees. A slip ring assembly 18, which rotates with the rotor 22, contacts a brush assembly 20. The brush assembly 20 and slip ring assembly 18 cooperate to provide electrical connections to the three sets of rotor windings 13a-c on the rotor 22.

In a conventional double-fed induction generator, the three rotor windings 13a-c are connected to active circuitry 29. The active circuitry 29 features an AC-to-DC converter 28 and a DC-to-AC converter 30 isolated from each other by a capacitor 32. Both the DC-to-AC converter 28 and the AC-to-DC converter 30 are under the control of a controller 26.

Figure 2:
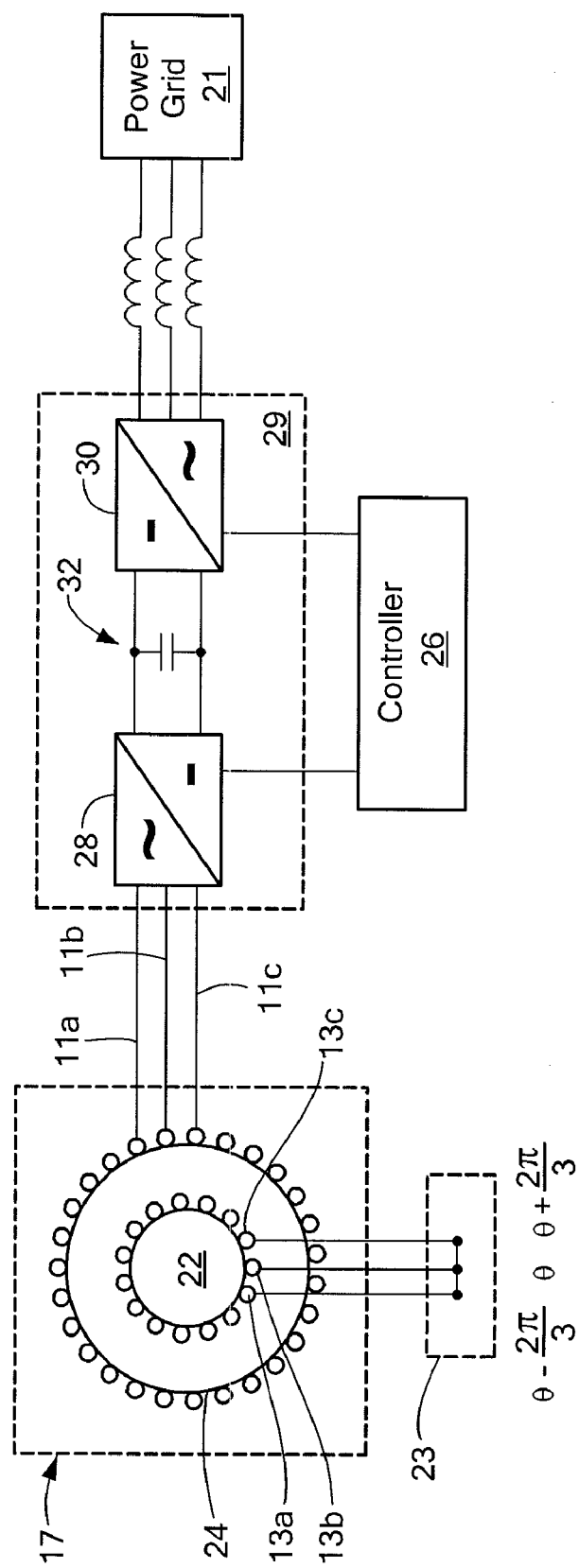
FIG. 2 shows a retro-fitted induction generator for the wind-energy converter of FIG. 1.

To retrofit the double-fed induction generator, the three rotor windings 13a-c are disconnected from the active circuitry 29 and shorted together by a short circuit 23, as shown in FIG. 2. The stator windings 11a-c are then connected to the active circuitry 29 instead of directly to the power grid 21, as they would be in a conventional double-fed induction generator.

The short circuit 23 can be achieved by shorting the corresponding conductors within the slip ring assembly 18. However, it is not important where the short circuit 23 is placed. In many cases, it is convenient to place the short circuit 23 on the non-rotating side of the brush assembly 20 rather than on the rotating side.

When the rotor windings 13a-c are shorted together, the rotor 22 functions in a manner analogous to the rotor in a squirrel cage induction motor. With the stator windings 11a-c connected to the active circuitry 29, the induction generator 17 now functions as a fully-converted induction generator.

In some cases, the active circuitry 29 may not be rated to handle the full power output of the induction generator 17. In such cases, it may be necessary to modify selected components of the active circuitry 29 to accommodate the greater demands caused by having to handle additional power.

With the induction generator 17 now connected as shown in FIG. 2, the rotor windings are no longer able to contribute to the generator's power output. As a result, in order to generate the same amount of power, the induction generator 17 should be operated at a higher power rating, preferably at about a 10% higher power rating, that it would have been had it been configured as a double-fed induction generator.

The controller 26 controls the active circuitry 29 so as to operate the induction generator 17 at a particular operating point. To operate the induction generator at a higher power rating, the controller 26 can cause more current to flow through the stator windings 11a-c while keeping the stator voltage constant. A disadvantage of this approach is that the stator windings 11a-c may overheat. In another approach, the controller 26 causes the stator voltage to be higher, thus increasing its power output without necessarily increasing current, and potentially overheating the stator windings 11a-c.

A method as described herein to reconfigure an induction generator from being a double-fed induction generator to a fully-converted induction generator thus provides a way to easily retrofit existing wind energy conversion systems to provide cleaner power to a power grid.

Having described the invention, and a preferred embodiment thereof, what I claim as new and secured by Letters Patent is:

1. A method for retro-fitting a wind-energy conversion system, said method comprising: disconnecting a first set of multiple windings from active circuitry; shorting together said first set of multiple windings; connecting a second set of multiple windings to said active circuitry; prior to said disconnection of said first set of multiple windings, using said wind-energy conversion system to convert wind energy into a first amount of electrical power; and following said connection of said second set, using said wind-energy system to convert wind energy into a second amount of electrical power, said second amount being equal to said first amount.

2. The method of claim 1, wherein shorting together said first set of multiple windings comprises shorting a slip ring assembly.

3. The method of claim 1, wherein shorting together said first set of multiple windings comprises causing a short circuit on a non-rotating side of a brush assembly that couples to said windings.

4. The method of claim 1, further comprising selecting said first set of multiple windings to be rotor windings.

5. The method of claim 4, wherein said rotor windings, when shorted, cause a rotor associated with the windings to function as a squirrel cage rotor.

6. The method of claim 1, further comprising selecting said second set of multiple windings to be stator windings.

7. The method of claim 1, further comprising using wind to generate electricity with said retro-fitted wind-energy conversion system.

8. The method of claim 7, further comprising providing said generated electricity to a power grid.

9. The method of claim 1, wherein shorting said first set of multiple windings comprises shorting while said first set of multiple windings is disconnected from said active circuitry.

10. The method of claim 1, wherein connecting a second set of multiple windings comprises connecting said second set of multiple windings while said first set of multiple windings is disconnected from said active circuitry.

11. The method of claim 1, wherein said active circuitry comprises a power converter.

12. The method of claim 1, wherein said wind-energy conversion system comprises a doubly-fed induction generator, and after retro-fit, said wind-energy conversion system comprises a fully-converted induction generator.

13. A method for retro-fitting a wind-energy conversion system, said method comprising: disconnecting a first set of multiple windings from active circuitry; shorting together said first set of multiple windings; connecting a second set of multiple windings to said active circuitry; prior to said disconnection of said first set of multiple windings, using said wind-energy conversion system to convert wind energy into a first amount of electrical power; and following said connection of said second set of multiple windings, using said wind-energy system to convert wind energy into a second amount of electrical power, said second amount being made equal to said first amount by causing power carried by said second set of multiple windings to compensate for loss of power carried said first set of windings.

14. The method of claim 13, wherein shorting together said first set of multiple windings comprises shorting a slip ring assembly.

15. The method of claim 13, wherein shorting together said first set of multiple windings comprises causing a short circuit on a non-rotating side of a brush assembly that couples to said windings.

16. The method of claim 13, further comprising selecting said first set of multiple windings to be rotor windings.

17. The method of claim 16, wherein said rotor windings, when shorted, cause a rotor associated with said windings to function as a squirrel cage rotor.

18. The method of claim 13, further comprising selecting said second set of multiple windings to be stator windings.

19. The method of claim 13, further comprising using wind to generate electricity with said retro-fitted wind-energy conversion system.

20. The method of claim 19, further comprising providing said generated electricity to a power grid.

21. The method of claim 13, wherein shorting said first set of multiple windings comprises shorting while said first set of multiple windings is disconnected from said active circuitry.

22. The method of claim 13, wherein connecting a second set of multiple windings comprises connecting said second set of multiple windings while said first set of multiple windings is disconnected from said active circuitry.

23. The method of claim 13, wherein said active circuitry comprises a power converter.

24. The method of claim 13, wherein said wind-energy conversion system comprises a doubly-fed induction generator, and after retro-fit, said wind-energy conversion system has a fully-converted induction generator.

* * * * *